United States Patent
Backer et al.

(10) Patent No.: US 8,349,112 B2
(45) Date of Patent: Jan. 8, 2013

(54) PROCESS FOR PRODUCING FABRICS COMPRISING UNIDIRECTIONALLY ARRANGED POLYMERIC TAPES

(75) Inventors: Jan Adolph Dam Backer, Sint-Oedenrode (NL); Bart Clemens Kranz, Uden (NL)

(73) Assignee: Novameer B.V., Veghel (NL)

( * ) Notice: Subject to any disclaimer, the term of this patent is extended or adjusted under 35 U.S.C. 154(b) by 490 days.

(21) Appl. No.: 12/311,329

(22) PCT Filed: Sep. 29, 2007

(86) PCT No.: PCT/EP2007/008499
§ 371 (c)(1),
(2), (4) Date: Feb. 12, 2010

(87) PCT Pub. No.: WO2008/040510
PCT Pub. Date: Apr. 10, 2008

(65) Prior Publication Data
US 2010/0162883 A1    Jul. 1, 2010

(30) Foreign Application Priority Data
Oct. 5, 2006  (EP) .................................. 06020901

(51) Int. Cl.
*D03D 15/00* (2006.01)
*D03D 11/00* (2006.01)
(52) U.S. Cl. .................... 156/181; 156/309.6; 428/36.1
(58) Field of Classification Search ............... 156/309.6, 156/180, 181; 428/36.1
See application file for complete search history.

(56) References Cited

U.S. PATENT DOCUMENTS

| | | | |
|---|---|---|---|
| 4,680,213 A * | 7/1987 | Fourezon | 428/105 |
| 5,578,370 A | 11/1996 | Ferrar et al. | |
| 6,610,618 B1 * | 8/2003 | Bottger et al. | 442/239 |
| 7,294,384 B2 * | 11/2007 | Eleazer et al. | 428/86 |
| 2004/0082242 A1 * | 4/2004 | Bottger et al. | 442/134 |

FOREIGN PATENT DOCUMENTS

| | | |
|---|---|---|
| EP | 0 747 518 A1 | 12/1996 |
| EP | 1 627 719 A1 | 2/2006 |
| JP | A-2005-330605 | 12/2005 |

* cited by examiner

*Primary Examiner* — Katarzyna Wyrozebski Lee
*Assistant Examiner* — Scott W Dodds
(74) *Attorney, Agent, or Firm* — Oliff & Berridge, PLC

(57) ABSTRACT

Process for producing fabrics comprising at least one layer of unidirectionally arranged polymeric tapes with the tapes comprising at least a core component, the process comprises the steps of forming at least one layer of unidirectionally arranged polymeric tapes in a weaving machine with the polymeric tapes being used as warp yarn and a binding thread being used as weft yarn or with the polymeric tapes being used as weft yarn and a binding thread being used as warp yarn and subsequently consolidating the at least one monolayer using pressure and heat, characterized in that the melting temperature of the binding yarns lies below the consolidating temperature and the melting temperature of the core component of the polymeric tapes lies above the consolidating temperature.

6 Claims, No Drawings

PROCESS FOR PRODUCING FABRICS COMPRISING UNIDIRECTIONALLY ARRANGED POLYMERIC TAPES

The invention pertains process for producing fabrics comprising unidirectionally arranged polymeric tapes and to articles made of same.

Due to distortions in the polymeric material, the polymeric tapes are usually undulated and handling i.e. processing of polymeric tapes is therefore very difficult. In addition the optimal performance of the tapes is lost.

EP 1 627 719 discloses a multilayered polyethylene material and ballistic articles manufactured therefrom. The multilayered material comprises a plurality of monolayers of unidirectionally oriented polyethylene strips. The monolayers are crossplied at an angle with respect to each other. Before a second monolayer is formed over the first monolayer, the first monolayer is consolidated by applying pressure and heat. After aligning the strips of the second monolayer at an angle to the first monolayer a bilayered mat is formed by again applying pressure and heat. A multilayered material may be obtained by consolidating at least two bilayered materials obtained as described above.

The process for producing the articles according to EP 1 627 719 requires consolidation of each layer and is thus very time consuming.

A different method for processing polymeric tapes is disclosed in U.S. Pat. No. 5,578,370. This document discloses a mat of mutually intersecting elongate elements produced e.g. by a weaving process. The elongated elements may be produced from a polymeric film coated on both sides with a polymeric material having a lower softening temperature range than the middle layer. The thus obtained composite film is slit to form tapes. The mat is then formed with the tapes by weaving, knitting or by laying down of a fibrous web. The mat is consolidated by heating the mat to fuse the tapes at least at their intersections. Prior to fusion a stack of two or more mats may be formed to obtain a product comprising at least two woven or knitted mats.

The process disclosed in U.S. Pat. No. 5,578,370 does not require consolidation of each layer since mats are formed in a weaving process. A stack of two or more mats may be formed prior to consolidation.

The weaving process, however, leads to an uneven surface. Due to the pattern of interlacing of warp and weft in a woven fabric and the fact that a thread operates over one and under the next crossing thread throughout the fabric the tapes disclosed in U.S. Pat. No. 5,578,370 are forced in a curved i.e. undulated shape. This results in a weaker product as compared to unidirectionally arranged tapes that lie straight and flat with regard to antiballistic properties e.g. impact strength.

It is therefore an object of the present invention to at least reduce the disadvantages of the prior art and to provide a process for producing fabrics comprising unidirectionally arranged polymeric tapes that allows efficient production of such fabrics while maintaining or enhancing strength and impact performance.

This object is achieved by a process for producing fabrics comprising at least one layer of unidirectionally arranged polymeric tapes with the tapes comprising at least a core component, the process comprises the steps of forming at least one layer of unidirectionally arranged polymeric tapes in a weaving machine with the polymeric tapes being used as warp yarn and a binding thread being used as weft yarn or with the polymeric tapes being used as weft yarn and a binding thread being used as warp yarn and subsequently consolidating the at least one monolayer using pressure and heat, characterised in that the melting temperature of the binding yarns lies below the consolidating temperature and the melting temperature of the core component of the polymeric tapes lies above the consolidating temperature.

This process leads to an undulating free fabric with the polymeric tapes lying flat and straight thus providing optimal strength and an even surface without the need for consolidating each layer separately in case a multilayered product is formed.

In the process according to the present invention the core component of the polymeric tapes does not melt and thus retains its initial properties.

If the polymeric tape comprises only a core component it contains only one polymer or a homogeneous mixture of polymers without phase separation. A polymeric tape comprising only a core component may be spun monofilaments. The term monofilament as used herein encompasses any single filament spun individually, e.g. by melt spinning or gel spinning. Tapes comprising only a core component could also be made in a solid state extrusion (SSE) or skived from solid material followed by post drawing. Tapes comprising only a core component may also be derived from a slit one layered film.

In the weaving machine the polymeric tapes are positioned under tension in a side by side relationship with adjacent tapes essentially abutting each other.

The polymeric tapes and the binding thread may be formed into a plain weave, a satin weave, twill weave and the like.

Preferably the melting temperature of the binding thread lies at least 5° C. below the melting temperature of the polymeric tapes provided that the melting temperature of the binding thread lies below the consolidating temperature and the melting temperature of the polymeric tapes lies above the consolidating temperature. More preferably the melting temperature of the binding thread lies at least 10° C. below the melting temperature of the polymeric tapes, most preferably the melting temperature of the binding thread lies at least 20° C. below the melting temperature of the polymeric tapes provided that the melting temperature of the binding thread lies below the consolidating temperature and the melting temperature of the polymeric tapes lies above the consolidating temperature.

The binding thread may be a monofilament yarn or a multifilament yarn. The binding thread may have any cross sectional shape including a quadrangular cross section as long as the melting temperature of the binding thread lies below the consolidating temperature and the melting temperature of the polymeric tapes lies above the consolidating temperature so that only the binding thread melts and distributes itself during consolidation thus acting as an adhesive to the tapes with the melting temperature lying above the consolidation temperature. The weaving undulation caused by the binding thread is then eliminated.

The thread material is selected from the group consisting of polyethylene, ultra high molecular weight polyethylene, polypropylene, polyamide, polybutadiene terephthalate and polyethylene terephthalate, polyethylene naphtalate, polyvinyl alcohol, polyphenylidensulfide, polyurethane, ethylene vinylacetate (EVA), copolymers of these polymers and mixtures thereof.

Preferably the tensile strength of the polymeric tapes used in the process according to the present invention is at least 200 MPa.

The tensile strength of the polymeric tapes is measured in accordance with ASTM D638.

It is preferred that the tapes have a tensile strength of at least 400 MPa, more preferably the polymeric tapes have a tensile strength of at least 800 MPa. Depending on the polymeric material and the draw ratio the polymeric tapes may exhibit a tensile strength of up to 20 GPa or more.

The term tape as used in the context of the present invention means flexible, elongate elements of essentially uniform width and thickness that can have any shape except a circular shape. The width/height ratio of the tapes is at least 2, preferably at least 5 and more preferably at least 20. Preferably the tapes according to the process of the present invention essentially have a quadrangular cross section.

In order to obtain fabrics with high tensile strength it is preferred that the polymeric tapes are drawn with a draw ratio of at least 1:5, more preferably the polymeric tapes are drawn with a draw ratio of at least 1:15. Draw ratios of 1:50 or more are especially preferred.

The polymeric tapes may also exhibit sheath core structures. The sheath may be applied to the core material, e.g. if monofilaments are used as tapes, by melt spinning the sheath along with the core material. The sheath material could also be applied to the core material in a later step before positioning in the weaving machine, e.g. with a doctor blade, by spraying, powder coating or leading the tapes through a polymer solution, dispersion or emulsion and the like. The ratio of sheath material to core material ranges from 0.5/99.5 to 50/50 wt %. The melting temperature of the sheath material preferably lies below the melting temperature of the core material. More preferably the melting temperature of the sheath material is similar to the melting temperature of the binding thread. Said core material and said sheath material in particular being selected from the group consisting of polyethylene, ultra high molecular weight polyethylene, polypropylene, polyamide, polybutadiene terephthalate and polyethylene terephthalate, polyethylene naphtalate, polyvinyl alcohol, polyphenylidensulfide, copolymers of these polymers and mixtures thereof.

In addition the sheath material may be selected from the group consisting of ethylene alkyl acrylate copolymer (EAA), ethylene vinyl acetate copolymer (EVA), ethylene-butyl acrylate copolymer (EBA), ethylenemethyl acrylate copolymer (EMA), linear low density polyethylene (LLDPE), high density polyethylenes (HDPE), low density polyethylenes (LPDE). It is also possible to use polyisobutylene (PIB) or polyurethane (PU) as sheath material. These polymers can be very flexible and may show high elongation. The sheath material may comprise one of the listed materials or mixtures of the listed sheath materials.

The polymeric tapes used in the process according to the invention may also be prepared by cutting or slitting a multi-layered polymer film. One or both surfaces of a polymer film, i.e. the core polymer, may be coated or co-extruded with a resin having a lower melting point than the core polymer.

Quadrangular tapes that are monofilaments may preferably be 1.5 mm to 10 mm in width and 20 µm to 1500 µm thick. Quadrangular tapes made by slitting a film may be 2 mm to 300 mm wide and—depending on the number of layers—1 µm to 1000 µm, preferably 4 µm to 50 µm thick.

In the process according to the present invention at least two layers of unidirectionally arranged polymeric tapes may be formed in a weaving machine with the polymeric tapes being used as warp yarn and a binding thread being used as weft yarn or with the polymeric tapes being used as weft yarn and a binding thread being used as warp yarn. The at least two layers of unidirectionally arranged polymeric tapes are being stacked on top of each other with the polymeric tapes of adjacent layers being crossplied at an angle and the stacked layers being consolidated using pressure and heat.

Preferably the layers are crossplied about perpendicular to each other. They may, however, also be stacked under an angle other than 90°.

The fabric according to the present invention may comprise more than 2, e.g. 3, 4 or up to 25, even up to 50 or up to 100 layers of unidirectionally arranged polymeric tapes formed in a weaving machine with the polymeric tapes being used as either warp or weft yarn and a binding thread being used as either weft or warp yarn.

It is further preferred if in the process according to the present invention a first layer of unidirectionally arranged polymeric tapes is formed in a weaving machine with the polymeric tapes being used as warp yarn and a binding thread being used as weft yarn and a second layer is formed in a weaving machine with the polymeric tapes being used as weft yarn and a binding thread being used as warp yarn, the first and second layer being stacked in an alternating manner with the polymeric tapes of adjacent layers being crossplied at an angle and the stacked layers being consolidated using pressure and heat. Up to 100 layers may be stacked in such an alternating manner of first and second layer.

If the layers are formed in the above described way such that a first layer of unidirectionally arranged polymeric tapes is formed in a weaving machine with the polymeric tapes being used as warp yarn and a binding thread being used as weft yarn and a second layer is formed in a weaving machine with the polymeric tapes being used as weft yarn and a binding thread being used as warp yarn, consolidation can be carried out in a continuous process. The polymeric tapes of the first layer and the second layer are already cross-plied if the first and the second layer are simply stacked in machine direction since in the first layer the tapes are woven in warp direction and in the second layer the tapes are woven in weft direction.

In yet another preferred embodiment the layers are brought in contact with a substrate layer on one or both sides of the fabric or sandwiched between the layers. The substrate layer may be in the form of a film, scrim, nonwoven or the like. The substrate layer consists of a polymeric material with a melting temperature lower than the consolidation temperature of the fabric. The substrate layer may also function as reinforcing material. A scrim or nonwoven would be preferred as reinforcing material.

In addition thereto further protective layers of any other suitable material can be provided, if one wishes so.

The fabrics produced in a process according to the present invention may be comprised in composite structures. The fabrics produced in a process according to the present invention may also be comprised in soft as well as in hard antiballistic structures.

In a special embodiment it is in particular preferable if the present antiballistic structure is provided with one or more layers of an impact resistant material, which impact-resistant material has preferably been selected from one or more of materials from the group consisting of metals, metal alloys, glass, basalt fibre, glass fibre, ceramics or other antiballistic materials like aramid or ultrahigh molecular weight polyethylene fibres. The layer of impact resistant material may be provided on one or on both surface sides or sandwiched between individual layers of the fabric.

The antiballistic structures may be walls, doors, plates, vests or inserts for vests, military applications such as combat helmets, body shields, armor panels for ground vehicles, aeroplane bodies and aeroplane doors or boats.

The invention claimed is:

1. Process for producing fabrics containing at least one layer of unidirectionally arranged polymeric tapes with the tapes including at least a core component, the tapes having a width/height ratio of at least 2, and said tapes having essentially a quadrangular cross section, the process comprising:

forming the at least one layer of unidirectionally arranged polymeric tapes in a weaving machine with the polymeric tapes being used as warp yarn and a binding thread being used as weft yarn or with the polymeric tapes being used as weft yarn and the binding thread being used as warp yarn and subsequently consolidating the at least one layer of unidirectionally arranged polymeric tapes using pressure and heat, wherein a melting temperature of the binding thread lies below a consolidating temperature, melting temperature of the core component of the polymeric tapes lies above the consolidating temperature, a first layer of unidirectionally arranged polymeric tapes is formed in the weaving machine with the polymeric tapes being used as warp yarn and the binding thread being used as weft yarn, a second layer is formed in a weaving machine with the polymeric tapes being used as weft yarn and the binding thread being used as warp yarn, the first layer and the second layer being stacked in an alternating manner with the polymeric tapes of adjacent layers being crossplied at an angle, and the stacked layers being consolidated using pressure and heat.

2. Process according to claim 1, wherein the polymeric tapes are monofilaments.

3. Process according to claim 1, wherein the polymeric tapes are sheath core tapes with the melting temperature of the sheath being below the melting temperature of the core.

4. Process according to claim 1, wherein the tensile strength of the polymeric tapes is at least 200 MPa.

5. Process according to claim 2, wherein the tensile strength of the polymeric tapes is at least 200 MPa.

6. Process according to claim 3, wherein the tensile strength of the polymeric tapes is at least 200 MPa.

* * * * *

UNITED STATES PATENT AND TRADEMARK OFFICE
CERTIFICATE OF CORRECTION

PATENT NO.         : 8,349,112 B2
APPLICATION NO.    : 12/311329
DATED              : January 8, 2013
INVENTOR(S)        : Jan Adolph Dam Backer et al.

It is certified that error appears in the above-identified patent and that said Letters Patent is hereby corrected as shown below:

In column 5, claim 1, line 16, before "melting" insert --a--.

Signed and Sealed this
Twelfth Day of March, 2013

Teresa Stanek Rea
*Acting Director of the United States Patent and Trademark Office*